US008304075B2

(12) United States Patent
Lang-Wittkowski et al.

(10) Patent No.: US 8,304,075 B2
(45) Date of Patent: Nov. 6, 2012

(54) COARSE-PARTICLE MICROCAPSULE PREPARATION

(75) Inventors: Gabriele Lang-Wittkowski, Mannheim (DE); Ekkehard Jahns, Weinheim (DE); Marco Schmidt, Speyer (DE); Michael Senge, Lemgo (DE); Markus Steffen, Maikammer (DE); Karl Kolter, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 673 days.

(21) Appl. No.: 11/572,968

(22) PCT Filed: Aug. 2, 2005

(86) PCT No.: PCT/EP2005/008354
§ 371 (c)(1),
(2), (4) Date: Jan. 30, 2007

(87) PCT Pub. No.: WO2006/018130
PCT Pub. Date: Feb. 23, 2006

(65) Prior Publication Data
US 2007/0248824 A1   Oct. 25, 2007

(30) Foreign Application Priority Data
Aug. 10, 2004 (EP) .................................. 04018933

(51) Int. Cl.
*B32B 27/14* (2006.01)
*B32B 5/16* (2006.01)
*C08K 7/16* (2006.01)

(52) U.S. Cl. ........... 428/402.24; 428/402.2; 428/402.21; 428/402.22; 523/223

(58) Field of Classification Search ..... 428/402–402.24; 504/206; 526/317.1; 523/223; 524/801, 524/802, 156; 442/131, 74, 75; 427/213.3–213.36; 264/4–4.7
See application file for complete search history.

(56) References Cited

U.S. PATENT DOCUMENTS

| | | | | |
|---|---|---|---|---|
| 4,254,201 A | * | 3/1981 | Sawai et al. | 430/110.2 |
| 4,747,240 A | * | 5/1988 | Voisinet et al. | 52/173.1 |
| 5,605,966 A | * | 2/1997 | Schuler et al. | 525/125 |
| 5,709,945 A | | 1/1998 | Lee et al. | |
| 5,804,297 A | | 9/1998 | Colvin et al. | |
| 6,200,681 B1 | | 3/2001 | Jahns et al. | |
| 6,660,667 B2 | * | 12/2003 | Zuckerman et al. | 442/131 |
| 6,703,127 B2 | * | 3/2004 | Davis et al. | 428/402.2 |
| 7,166,355 B2 | * | 1/2007 | Jahns et al. | 428/402.21 |
| 2001/0000517 A1 | * | 4/2001 | Zuckerman et al. | 524/556 |
| 2004/0079515 A1 | | 4/2004 | Fieback et al. | |
| 2004/0234738 A1 | | 11/2004 | Jahns et al. | |

FOREIGN PATENT DOCUMENTS

| | | | |
|---|---|---|---|
| DE | 197 49 731 A1 | 5/1999 | |
| DE | 100 48 536 A1 | 5/2001 | |
| DE | 100 58 101 A1 | 6/2002 | |
| DE | 102 00 316 A1 | 7/2002 | |
| DE | 101 39 171 A1 | 2/2003 | |
| EP | 1 029 018 B1 | 9/2001 | |
| GB | 870476 | 6/1961 | |
| JP | 55048268 * | 4/1980 | 523/164 |
| JP | S55-48268 | 4/1980 | |
| JP | 2001-81447 | 3/2001 | |
| JP | 2001-98259 | 4/2001 | |
| JP | 2001-303032 | 10/2001 | |
| JP | 2002-310582 | 10/2002 | |
| JP | 2005-54064 | 3/2005 | |
| WO | WO 02/24789 A2 | 3/2002 | |

* cited by examiner

*Primary Examiner* — James J Seidleck
*Assistant Examiner* — S. Camilla Pourbohloul
(74) *Attorney, Agent, or Firm* — Oblon, Spivak, McClelland, Maier & Neustadt, L.L.P.

(57) ABSTRACT

The present invention relates to a coarsely divided microcapsule preparation with particles whose particle sizes are in the range from 200 μm to 5 cm, comprising microcapsules with a capsule core of latent heat storage material and a thermosetting polymer as capsule wall and one or more polymeric binders whose binder polymer has thermoplastic properties and film-forming properties under processing conditions, where the binder content, calculated as solid, is 1-30% by weight, based on the total weight of the coarsely divided microcapsule preparation.

19 Claims, No Drawings

COARSE-PARTICLE MICROCAPSULE PREPARATION

The present invention relates to a coarsely divided microcapsule preparation comprising microencapsulated latent heat storage media and one or more polymeric binders, and to methods of producing them and their use in heat exchangers and building materials.

In recent years, building materials with latent heat storage media have been investigated as novel material combination. Their mode of function is based on the conversion enthalpy which arises during the solid/liquid phase transition, which signifies an absorption of energy or release of energy into the surrounding area. They can thus be used to keep the temperature constant within a fixed temperature range. Since the latent heat storage materials are also present in liquid form depending on the temperature, they cannot be processed directly with building materials since emissions into the atmosphere and also separation from the building material would be aspects of concern.

EP-A-1 029 018 teaches the use of microcapsules with a capsule wall made of a highly crosslinked methacrylic ester polymer and a latent heat storage core in binding building materials such as concrete or gypsum. Since the capsule walls only have a thickness in the range from 5 to 500 nm they are, however, very pressure-sensitive, an effect which is utilized for their use in copy papers. However, this restricts their usefulness.

DE-A-101 39 171 describes the use of microencapsulated latent heat storage materials in gypsum plasterboards. In addition, the earlier U.S. application Ser. No. 60/573,420 teaches the use of microencapsulated latent heat storage materials in chipboards together with melamine formaldehyde resins as binders.

For all of these various applications the microcapsules are used as powders with particle sizes in the range from 1 to 50 µm. However, powders are often difficult to process. The consequence is formulations with a high binder content. Looking at the ratio of microcapsules to binder calculated as solid based on their sum in the specifications described above, then the microcapsule fraction extends to at most 30% by weight and the binder fraction is 70% by weight and more. Optimization by increasing the fraction of latent heat storage media, which indeed corresponds to the microcapsule fraction, was therefore desirable.

JP 2001093259 describes the mixing of microencapsulated latent heat storage material with water and cement and commination of the cured material to particle sizes >1 mm. Such particles are used as fillings in walls and floors.

JP 2001303032 teaches a microcapsule extrudate of a silica gel pigment and a microcapsule dispersion whose microcapsules have a capsule core of latent heat storage material.

U.S. Pat. No. 6,703,127 teaches microparticles which are formed by suspending microencapsulated latent heat storage material in a solution of a thickener, and curing the drops by dripping into a crosslinker solution. Drops cured in this way have considerably poorer application properties.

GB 870 476 describes microcapsules comprising microcapsules with a film-forming wall material such as gelatin which are held together by a capsule wall of such a film-forming polymer to give clusters. Such macrocapsules have much poorer application properties since they tend to swell and are sensitive to bacteria.

DE-A-102 00 316 teaches the production of plastic molded articles made of plastic granules to which carrier material parts with latent heat storage media are added prior to being injected into the mold cavity. The capillary spaces of the mineral carrier materials have an absorbent solid structure in which the latent heat storage materials are held. Capillary spaces within the carrier material are, however, ultimately open systems meaning that in the case of temperature increases, when the latent heat storage media convert to the liquid phase, an escape of liquid wax always has to be reckoned with.

DE-A-100 58 101 describes latent heat storage bodies with an external shell body made of hard plastic such as polymethyl methacrylate and a filling of latent heat storage material. These bodies are produced by means of a twin-component extrusion process. The latent heat storage material here is solidified in a gel-like manner by adding block copolymers. In this way final rolling of the body can produce large heat storage plates. Here, as also in DE-A-102 00 316, the latent heat storage materials are processed directly and stabilization is achieved through the wax additives.

Finally, DE-A-100 48 536 teaches a dynamic latent heat storage medium with a gel-like thickened latent heat storage material between whose small particles a heat carrier flows. The function principle is based on the fact that the heat carrier liquid evaporates and, upon contact with the latent heat storage medium, condenses and transfers the energy to it. However, it is problematical that the particles become soft as a result of the input of heat and the flow paths become narrower.

The use of gel-like solidified latent heat storage materials and an additional supporting structure results moreover in the fraction of the latent heat storage material, based on the total weight of the preparation, being less than 50 by weight.

WO 200224789 deals with polymer blends of polyethylene which are obtained by mixing molten polyethylene with microencapsulated latent heat storage media and subsequent commination and, in a second processing step, are extruded together with polypropylene. Pellets obtained in this way, however, have a very small fraction of latent heat storage media, meaning that the heat storage capacity is only low.

It was therefore one aspect of the present invention to find a latent heat storage preparation whose fraction of latent heat storage material is high and which thus has a high storage energy and a high degree of activity.

In addition, the latent heat storage preparation should advantageously be able to be used in heat exchangers and in open systems, as for central and decentral ventilation.

Accordingly, the abovementioned coarsely divided microcapsule preparation comprising one or more microencapsulated latent heat storage materials and one or more polymeric binders has been found.

Preference is given to a coarsely divided microcapsule preparation with particles whose particle sizes are in the range from 200 µm to 5 cm, comprising microcapsules with a capsule core of latent heat storage material and a thermosetting polymer as capsule wall and one or more polymeric binders whose binder polymer has thermoplastic properties and film-forming properties under processing conditions, where the binder content, calculated as solid, is 1-30% by weight, based on the total weight of the coarsely divided microcapsule preparation, and to methods of producing them and their use in heat exchangers and building materials.

For the purposes of the present invention, coarsely divided is understood as meaning particles whose dimensions vary within the range from 200 µm to 5 cm, preferably 500 µm to 2 cm. These particles can have an amorphous, sphere-like to a rod-shaped form, depending on the particular production method. In cases of sphere-like structures, the average diameter is 200 µm to 2 cm, preferably 500 µm to 1 cm. Rod-like shapes have in their longest extent a value of at most 5 cm, generally in the range from 1 mm to 2 cm. The shortest extent has a value of at least 200 µm, generally from 500 µm to 5 mm. In the case of the rod-like particles, the ratio of length to diameter will usually not exceed the value 10:1, preferably the value 5:1.

In the preferred microcapsule preparations according to the invention, 90% by weight of the particles are >500 µm, preferably >700 µm, in particular >1 mm, determined by sieve technology.

The particles according to the invention are asymmetric aggregates of powder particles which only approximately have the shape of a sphere, a rod, a cylinder and whose surface is often uneven and jagged. Such particles are often also referred to as granules or agglomerate. Another form of the agglomerates is compacts, so-called pellets or tablets as are known from the production of drugs.

The coarsely divided preparations according to the invention consist, in an amount of at least 90% by weight, predominantly of microcapsules and polymeric binder. Preferably, the binder content, calculated as solid, is 1-40% by weight, preferably 1-30% by weight, particularly preferably 1-25% by weight, in particular 1-20% by weight and ver particularly preferably 2-15% by weight, based on the total weight of the coarsely divided preparation.

Based on their total weight, preferred preparations comprise 55-94% by weight of latent heat storage material, 1-30% by weight of polymeric binder calculated as solid, microcapsule wall material and 0-10% by weight of other additives.

Particular preference is given to preparations, in particular granules, comprising 85-99% by weight of microencapsulated latent heat storage media, 1-15% by weight of polymeric binder calculated as solid and 0-5% by weight of other additives.

Since the coarsely divided microcapsule preparations are mostly prepared by processing with water or aqueous substances, the preparations may also comprise residues of water. The amount of residual moisture is usually from 0 to about 2% by weight, based on the total weight.

The microcapsules present in the preparation are particles with a capsule core consisting primarily, in an amount of more than 95% by weight, of latent heat storage materials and a polymer as capsule wall. The capsule core is here solid or liquid depending on the temperature. The average particle size of the capsules (number average by means of light scattering) is 0.5 to 100 µm, preferably 1 to 30 µm, in particular 1 to 50 µm. The weight ratio of capsule core to capsule wall is generally from 50:50 to 95:5. Preference is given to a core/wall ratio of 70:30 to 93:7.

According to the definition, latent heat storage materials are substances which have a phase transition in the temperature range in which heat transfer is to take place. Preferably, the latent heat storage materials have a solid/liquid phase transition in the temperature range from −20 to 120° C. The latent heat storage material is generally an organic, preferably lipophilic substance.

Examples of suitable substances are
aliphatic hydrocarbon compounds such as saturated or unsaturated $C_{10}$-$C_{40}$-hydrocarbons, which are branched or preferably linear, e.g. such as n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane and cyclic hydrocarbons, e.g. cyclohexane, cyclooctane, cyclodecanre;
aromatic hydrocarbon compounds, such as benzene, naphthalene, biphenyl, o- or n-terphenyl, $C_1$-$C_{40}$-alkyl-substituted aromatic hydrocarbons, such as dodecylbenzene, tetradecylbenzene, hexadecylbenzene, hexylnaphthalene or decyinaphthalene;
saturated or unsaturated $C_6$-$C_{30}$-fatty acids, such as lauric, stearic, oleic or behenic acid, preferably eutectic mixtures of decanoic acid with e.g. myristic, palmitic or lauric acid;
fatty alcohols, such as lauryl, stearyl, oleyl, myristyl, cetyl alcohol, mixtures such as coconut fatty alcohol, and the so-called oxo alcohols which are obtained by hydroformylation of α-olefins and further reactions;
$C_6$-$C_{30}$-fatty amines, such as decylamine, dodecylamine, tetradecylamine or hexadecylamine;
esters such as $C_1$-$C_{10}$-alkyl esters of fatty acids, such as propyl palmitate, methyl stearate or methyl palmitate, and preferably their eutectic mixtures or methyl cinnamate;
natural ard synthetic waxes, such as montan acid waxes, montan ester waxes, carnauba wax, polyethylene wax, oxidized waxes, polyvinyl ether wax, ethylene vinyl acetate wax or hard waxes in accordance with Fischer-Tropsch processes;
halogenated hydrocarbons, such as chloroparaffin, bromooctadecane, bromopentadecane, bromononadecane, bromoeicosane, bromodocosane.

Mixtures of these substances are also suitable provided the melting point is not lowered outside of the desired range, or the heat of fusion of the mixture is too low for a useful application.

For example, the use of pure n-alkanes, n-alkanes with a purity greater than 80% or of alkane mixtures as are produced as technical-grade distillate and as such are commercially available is advantageous.

In addition, it may be advantageous to add to the capsule core-forming substances compounds which are soluble therein in order to prevent the lowering of the freezing point which sometimes arises with nonpolar substances. As described in U.S. Pat. No. 5,456,852 it is advantageous to use compounds with a melting point 20 to 120 K higher than the actual core substance. Suitable compounds are the fatty acids, fatty alcohols, fatty amides and aliphatic hydrocarbon compounds mentioned above as lipophilic substances. They are added in amounts of from 0.1 to 10% by weight, based on the capsule core.

The latent heat storage materials are chosen depending on the temperature range in which the heat storage media are desired. For example, for heat storage media in building materials in a moderate climate preference is given to using latent heat storage materials whose solid/liquid phase transition is in the temperature range from 0 to 60° C. Thus, for interior applications individual materials or mixtures with conversion temperatures of from 15 to 30° C. are usually chosen. In the case of solar applications as storage medium or avoiding the overheating of transparent thermal insulation, as described in EP-A-333 145, conversion temperatures of 30-60° C. are especially suitable.

Preferred latent heat storage materials are aliphatic hydrocarbons, particularly preferably those listed above by way of example. Particular preference is given to aliphatic hydrocarbons having 14 to 20 carbon atoms, and mixtures thereof.

As polymer for the capsule wall it is in principle possible to use the materials known for the microcapsules for copy papers. Thus, it is, for example, possible to encapsulate the latent heat storage materials in gelatin with other polymers by the processes described in GB-A 870476, U.S. Pat. Nos. 2,800,457, 3,041,289.

Preferred wall materials for the capsule wall of the microcapsules, being very stable to aging, are thermosetting polymers. Thermosetting here is understood as meaning wall materials which, due to the high degree of crosslinking, do not soften but degrade at high temperatures. Suitable thermosetting wall materials are, for example, highly crosslinked formaldehyde resins, highly crosslinked polyureas and highly crosslinked polyurethanes and highly crosslinked acrylic and methacrylic ester polymers.

Formaldehyde resins are understood as meaning reaction products of formaldehyde with
triazines such as melamine
carbamides such as urea
phenols, such as phenol, m-cresol and resorcinol
amino and amido compounds, such as aniline, p-toluenesulfonamide, ethyleneurea and guanidine,
or their mixtures.

Formaldehyde resins preferred as capsule wall material are urea-formaldehyde resins, urea-resorcinol-formaldehyde resins, urea-melamine resins and melamine-formaldehyde resins. Preference is likewise given to the $C_1$-$C_4$-alkyl, in particular methyl, ethers of these formaldehyde resins, and the mixtures with these formaldehyde resins. Particular preference is given to melamine-formaldehyde resins and/or methyl ethers thereof.

In the processes known from copy papers, the resins are used as prepolymers. The prepolymer is also soluble in the aqueous phase and in the course of the polycondensation migrates to the interface and surrounds the oil droplets. Microencapsulation processes with formaldehyde resins are generally known and described, for example, in EP-A-562 344 and EP-A-974 394.

Capsule walls made of polyureas and of polyurethanes are likewise known from copy papers. The capsule walls are formed by reacting reactants carrying $NH_2$ groups and/or OH groups with di- and/or polyisocyanates. Suitable isocyanates are, for example ethylene diisocyanate, 1,4-tetramethylene diisocyanate, 1,6-hexamethylene diisocyanate and 2,4- and 2,6-tolylene diisocyanate. Mention may also be made of polyisocyanates such as derivatives with biuret structure, polyuretonimines and isocyanurates. Suitable reactants are hydrazine, guanidine and salts thereof, hydroxylamine, di- and polyamines and amino alcohols. Such inter ace polyaddition processes are known, for example, from U.S. Pat. No. 4,021,595, EP-A 0 392 876 and EP-A 535 384.

Preference is given to microcapsules whose capsule wall is a highly crosslinked methacrylic ester polymer. The degree of crosslinking is achieved here with a crosslinker fraction of ≧10% by weight, based on the total polymer.

In the preferred microcapsules, the wall-forming polymers are constructed from 10 to 100% by weight, preferably 30 to 95% by weight, of one or more $C_1$—$C_{24}$-alkyl esters of acrylic and/or methacrylic acid as monomers I. In addition, the polymers can comprise up to 80% by weight, preferably 5 to 60% by weight, in particular 10 to 50% by weight of a bi- or polyfunctional monomer as monomers II, which is insoluble or sparingly soluble in water, in copolymerized form. In addition, the polymers can comprise up to 90% by weight, preferably up to 50% by weight, in particular up to 30% by weight, of other monomers II in copolymerized form.

Suitable monomers I are $C_1$-$C_{24}$-alkyl esters of acrylic and/or methacrylic acid. Particularly preferred monomers I are methyl, ethyl, n-propyl and n-butyl acrylate and/or the corresponding methacrylates. Preference is given to isopropyl, isobutyl, sec-butyl and tert-butyl acrylate and the corresponding methacrylates. Methacrylonitrile should also be mentioned. In general, the methacrylates are preferred.

Suitable monomers II are bi- or polyfunctional monomers which are insoluble or sparingly soluble in water, but have a good to limited solubility in the lipophilic substance. Sparingly soluble is understood as meaning a solubility of less than 60 g/l at 20° C. Bi- or polyfunctional monomers are understood as meaning compounds which have at least 2 nonconjugated ethylenic double bonds. Of particular suitability are divinyl and polyvinyl monomers which bring about crosslinking of the capsule wall during the polymerization.

Preferred bifunctional monomers are the diesters of diols with acrylic acid or methacrylic acid, and also the diallyl and divinyl ethers of these diols.

Preferred divinyl monomers are ethanediol diacrylate, divinylbenzene, ethylene glycol dimethacrylate, 1,3-butylene glycol dimethacrylate, methallylmethacrylamide and allyl methacrylate. Particular preference is given to propanediol diacrylate, butanediol diacrylate, pentanediol diacrylate and hexanediol diacrylate or the corresponding methacrylates.

Preferred polyvinyl monomers are trimethylolpropane triacrylate and methacrylate, pentaerythritol triallyl ether and pentaerythritol tetraacrylate.

Suitable monomers III are other monomers, preference being given to monomers IIIa such as vinyl acetate, vinyl propionate and vinylpyridine.

Particular preference is given to the water-soluble monomers IIIb, e.g. acrylonitrile, methacrylamide, acrylic acid, methacrylic acid itaconic acid, maleic acid, maleic anhydride, N-vinylpyrrolidone, 2-hydroxyethyl acrylate and methacrylate and acrylamido-2-methylpropanesulfonic acid. In addition, N-methylolacrylamide, N-methylolmethacrylamide, dimethylaminoethyl methacrylate and diethylaminoethyl methacrylate in particular should be mentioned.

According to a further preferred embodiment, the wall-forming polymers are formed from 30 to 90% by weight of methacrylic acid, 10 to 70% by weight of an alkyl ester of (meth)acrylic acid, preferably methyl methacrylate, tert-butyl methacrylate, phenyl methacrylate and cyclohexyl methacrylate, and 0 to 40% by weight of further ethylenically unsaturated monomers. These further ethylenically unsaturated monomers may be the monomers I, II or III hitherto not mentioned for this embodiment. Since they generally have no significant effect on the formed microcapsules of this embodiment, their fraction is preferably <20% by weight, in particular <10% by weight.

Such microcapsules and their preparation are described in EP-A-1 251 954, to which reference is expressly made.

The microcapsules suitable for the use according to the invention can be prepared by a so-called in-situ polymerization.

The preferred microcapsules and their preparation are known from EP-A-457 154, DE-A-10 139 171, DE-A-102 30 581 and EP-A-1 321 182, to which reference is expressly made. Thus, the microcapsules are produced by using the monomers, a free-radical initiator, a protective colloid and the lipophilic substance to be encapsulated to produce a stable oil-in-water emulsion in which they are present as disperse phase. Polymerization of the monomers is then triggered by heating and controlled through a further temperature increase, the resulting polymers forming the capsule wall which surrounds the lipophilic substance.

As a rule, the polymerization is carried out at 20 to 100° C., preferably at 40 to 80° C. Naturally, the dispersion and polymerization temperature should be above the melting temperature of the lipophilic substances.

After reaching the end temperature, the polymerization is expediently continued for about a period of up to 2 hours in order to reduce residual monomer contents. After the actual polymerization reaction at a conversion of 90 to 99% by weight, it is generally advantageous to render the aqueous microcapsule dispersions largely free of odor carriers, such as residual monomers and other organic volatile constituents. This can be achieved in a manner known per se by physical means by distillate removal (in particular by means of steam distillation) or by stripping with an inert gas. It may also be carried out by chemical means, as described in WO 9924525, advantageously by redox-initiated polymerization, as described in DE-A 4 435 423, DE-A 4419518 and DE-A 4435422.

In this way it is possible to produce microcapsules with an average particle size in the range from 0.5 to 100 μm, it being possible to adjust the particle size in a manner known per se via the shear force, the stirring speed, the protective colloid and its concentration.

Preferred protective colloids are water-soluble polymers since these reduce the surface tension of the water from 73 mN/m maximum to 45 to 70 mN/m and thus ensure the formation of sealed capsule walls, and form microcapsules with preferred particle sizes between 1 and 300 μm, preferably 3 and 12 μm.

As a rule, the microcapsules are prepared in the presence of at least one organic protective colloid, which may either be anionic or neutral. Anionic and nonionic protective colloids may also be used together. Preference is given to using inorganic protective colloids, if appropriate in a mixture with organic protective colloids or nonionic protective colloids.

Organic neutral protective colloids are cellulose derivatives, such as hydroxyethylcellulose, methylhydroxyethylcellulose, methylcellulose and carboxymethylcellulose, polyvinylpyrrolidone, copolymers of vinylpyrrolidone, gelatin, gum arabic, xanthan, sodium alginate, casein, polyethylene glycols, preferably polyvinyl alcohol and partially hydrolyzed polyvinyl acetates and methylhydroxypropylcellulose.

Suitable anionic protective colloids are polymethacrylic acid, the copolymers of sulfoethyl acrylate and methacrylate, sulfopropyl acrylate and methacrylate, N-(sulfoethyl)maleimide, 2-acrylamido-2-alkylsulfonic acids, styrenesulfonic acid and vinylsulfonic acid.

Preferred anionic protective colloids are naphthalenesulfonic acid and naphthalenesulfonic acid-formaldehyde condensates and in particular polyacrylic acids and phenolsulfonic acid-formaldehyde condensates.

The anionic and nonionic protective colloids are generally used in amounts of from 0.1 to 10% by weight, based on the water phase of the emulsion.

Preference is given to inorganic protective colloids, so-called Pickering systems, which enable stabilization through very fine solid particles and are insoluble, but dispersible in water or are insoluble and nondispersible in water, but wettable by the lipophilic substance.

The mode of action and its use is described in EP-A-1 029 018 and EP-A-1 321 182, to the contents of which reference is expressly made.

A Pickering system can here consist of the solid particles on their own or additionally of auxiliaries which improve the dispersibility of the particles in water or the wettability of the particles by the lipophilic phase.

The inorganic solid particles may be metal salts, such as salts, oxides and hydroxides of calcium, magnesium, iron, zinc, nickel, titanium, aluminum, silicon, barium and manganese. Examples are magnesium hydroxide, magnesium carbonate, magnesium oxide, calcium oxalate, calcium carbonate, barium carbonate, barium sulfate, titanium dioxide, aluminum oxide, aluminum hydroxide and zinc sulfide. Silicates, bentonite, hydroxyapatite and hydrotalcites may likewise be mentioned. Particular preference is given to highly disperse silicas, magnesium pyrophosphate and tricalcium phosphate.

The Pickering systems may be added either firstly to the water phase, or be added to the stirred emulsion of oil-in-water. Some fine solid particles are prepared by a precipitation as described in EP-A 1 029 018, and EP-A 1 321 182.

The highly disperse silicas may be dispersed as fine solid particles in water. It is, however, also possible to use so-called colloidal dispersions of silica in water. The colloidal dispersions are alkaline, aqueous mixtures of silica. In the alkaline pH range, the particles are swollen and are stable in water. For a use of these dispersions as Pickering system, it is advantageous if the pH of the oil-in-water emulsion is adjusted to pH 2 to 7 with an acid.

The inorganic protective colloids are generally used in amounts of from 0.5 to 15% by weight, based on the water phase.

In general, the organic neutral protective colloids are used in amounts of from 0.1 to 15% by weight, preferably from 0.5 to 10% by weight, based on the water phase.

Preferably, the dispersion conditions for preparing the stable oil-in-water emulsion are chosen in a manner known per se such that the oil droplets have the size of the desired microcapsules.

The microcapsule dispersions obtained by the polymerization produce a readily flowable capsule powder upon spray-drying. The spray-drying of the microcapsule dispersion can be carried out in a customary manner. In general, the procedure is carried out such that the inlet temperature of the stream of warm air is in the range from 100 to 200° C., preferably 120 to 160° C., and the exit temperature of the stream of warm air is in the range from 30 to 90° C., preferably 60 to 80° C. The spraying of the aqueous polymer dispersion in the stream of warm air can take place, for example, by means of single- or multi-material nozzles or via a rotating disk. The polymer powder is normally deposited using cyclones or filter separators. The sprayed aqueous polymer dispersion and the stream of warm air are preferably introduced in parallel.

If appropriate, for the spray-drying spray auxiliaries are added in order to facilitate the spray-drying, or to establish certain powder properties, e.g. lack of dust, flowability or improved redispersibility. The person skilled in the art is familiar with a large number of spray auxiliaries. Examples thereof are given in DE-A 196 29 525, DE-A 196 29 526, DE-A 22 14 410, DE-A 24 45 813, EP-A 407 889 or EP-A 784 449. Advantageous spray auxiliaries are, for example, water-soluble polymers of the polyvinyl alcohol type or partially hydrolyzed polyvinyl acetates, cellulose derivatives, such as hydroxyethyl-cellulose, carboxymethylcellulose, methylcellulose, methylhydroxyethylcellulose and methylhydroxypropylcellulose, polyvinylpyrrolidone, copolymers of vinylpyrrolidone, gelatin, preferably polyvinyl alcohol and partially hydrolyzed polyvinyl acetates and methylhydroxypropylcellulose.

Polymeric binders are generally known. These are fluid systems which comprise, as disperse phase in aqueous dispersion medium, polymer tangles consisting of two or more intertwined polymer chains, the so-called polymer matrix or polymer particles, present in disperse distribution. The weight-average diameter of the polymer particles is frequently in the range from 10 to 1000 nm, often 50 to 500 nm or 100 to 400 nm. Besides the polymer (binder polymer), the polymeric binder comprises the auxiliaries described below. The binder polymers according to the invention preferably have thermoplastic properties. Thermoplastic is to be understood here as meaning that the binder polymers soften without decomposition above the glass transition temperature.

According to the invention, polymeric binders which can be used are in principle all finely divided polymers (binder polymers) which are able at the processing temperature to form a polymer film. i.e. are film-forming at these temperatures. According to a preferred variant, the polymers are not water-soluble. This enables the coarsely divided preparations according to the invention to be used in moist or aqueous systems.

According to the invention, it is possible to use those polymers whose glass transition temperature is −60 to +150° C., often −20 to +130° C. and frequently 0 to +120° C. Glass transition temperature ($T_g$) means the limit of the glass transition temperature to which, according to G. Kanig (Kolloid-Zeitschrift & Zeitschrift für Polymere, Vol, 190, page 1, equation 1), the glass transition temperature tends with increasing molecular weight. The glass transition temperature is determined by the DSC method (Differential Scanning Calorimetry, 20 min, midpoint measurement, DIN 53 7655

Very particular preference is given to polymers with a glass transition temperature in the range from 40 to 120° C. As a rule, these are processed at temperatures in the range from 20 to 120° C. Coarsely divided compositions obtained in this way exhibit particularly good mechanical stability and have good abrasion values.

The glass transition temperature of polymers which are constructed from ethylenically unsaturated monomers can be controlled in a known manner via the monomer composition (T. G. Fox Bull. Am Phys. Soc. Ser. II) 1, 123 [1956] and Ullmanns Encyclopedia of Industrial Chemistry $5^{th}$ edition, Vol. A21, Weinheim (1989) p. 169).

Preferred polymers are constructed from ethylenically unsaturated monomers M which generally comprise at least 80% by weight, in particular at least 90% by weight, of ethylenically unsaturated monomers A which are chosen from monomers with a solubility in water of <10 g/l (25° C. and 1 bar) and mixtures thereof with acrylonitrile and/or methacrylonitrile, where the fraction of acrylonitrile and methacrylonitrile does not usually exceed 30% by weight and is, for example, 1 to 30% by weight or 5 to 25% by weight of the monomers A. In addition, the polymers also comprise 0.5 to 20% by weight of monomers B different from the monomers A. Here and below, all of the quantitative data for monomers are in % by weight based on 100% by weight of monomers M.

Monomers A are generally monoethylenically unsaturated or conjugated diolefins. Examples of monomers A are:
esters of an α,β-ethylenically unsaturated $C_3$-$C_6$-monocarboxylic acid or $C_4$-$C_8$-dicarboxylic acid with a $C_1$-$C_{10}$-alkanol. These are preferably esters of acrylic acid or methacrylic acid, such as methyl(meth)acrylate, ethyl (meth)acrylate, n-butyl (meth)acrylate, t-butyl(meth)acrylate, 2-ethylhexyl(meth)acrylate etc.;
vinylaromatic compounds, such as styrene, 4-chlorostyrene, 2-methylstyrene etc.;
vinyl esters of aliphatic carboxylic acids having preferably 1 to 10 carbon atoms, such as vinyl acetate, vinyl propionate, vinyl laurate, vinyl stearate, versatic acid vinyl ester etc.;
olefins, such as ethylene or propylene;
conjugated diolefins, such as butadiene or isoprene;
vinyl chloride or Vinylidene chloride.

Preferred film-forming polymers are chosen from the polymer classes I to IV listed below:
I) copolymers of styrene with alkyl(acrylates), i.e. copolymers which comprise, as monomer A, styrene and at least one $C_1$-$C_{10}$-alkyl ester of acrylic acid and, if appropriate, one or more $C_1$-$C_{10}$-alkyl esters of methacrylic acid in copolymerized form
II) copolymers of styrene with butadiene, i.e. copolymers which comprise, as monomer A, styrene and butadiene and, if appropriate, (meth)acrylates of $C_1$-$C_8$-alkanols, acrylonitrile and/or methacrylonitrile;
III) homopolymers and copolymers of alkyl(meth)acrylates (straight acrylates), i.e. homopolymers and copolymers which comprise, as monomers A, at least one $C_1$-$C_{10}$alkyl ester of acrylic acid and/or a $C_1$-$C_{10}$-alkyl ester of methacrylic acid in copolymerized form, in particular copolymers which comprise, as monomers A, methyl methacrylate, at least one $C_1$-$C_{10}$-alkyl ester of acrylic acid and, if appropriate, a $C_2$-$C_{10}$-alkyl ester of methacrylic acid in copolymerized form;
IV) homopolymers of vinyl esters of aliphatic carboxylic acids and copolymers of vinyl esters of aliphatic carboxylic acids with olefins and/or alkyl(meth)acrylates, i.e. homopolymers and copolymers which comprise, as monomer A, at least one vinyl ester of an aliphatic carboxylic acid with 2 to 10 carbon atoms and if appropriate one or more $C_2$-$C_6$-olefins and/or, if appropriate, one or more $C_1$-$C_{10}$-alkyl esters of acrylic acid and/or of methacrylic acid in copolymerized form;
V) copolymers of styrene with acrylonitrile.

Typical $C_1$-$C_{10}$-alkyl esters of acrylic acid in the copolymers of class I to IV are ethyl acrylate, n-butyl acrylate, tert-butyl acrylate, n-hexyl acrylate and 2-ethylhexyl acrylate.

Typical copolymers of class I comprise, as monomers A, 20 to 80% by weight and in particular 30 to 70% by weight of styrene and 20 to 80% by weight, in particular 30 to 70% by weight, of at least one $C_1$-$C_{10}$-alkyl ester of acrylic acid, such as n-butyl acrylate, ethyl acrylate or 2-ethylhexyl acrylate, in each case based on the total amount of the monomers A.

Typical copolymers of class II comprise, as monomers A, in each case based on the total amount of the monomers A, 30 to 85% by weight, preferably 40 to 80% by weight and particularly preferably 50 to 75% by weight, of styrene and 15 to 70% by weight, preferably 20 to 60% by weight and particularly preferably 25 to 50% by weight, of butadiene, where 5 to 20% by weight of the abovementioned monomers A can be replaced by meth)acrylic esters of $C_1$-$C_8$-alkanols and/or by acrylonitrile or methacrylonitrile.

Typical copolymers of class III comprise as monomers A, in each case based on the total amount of the monomers A, 20 to 80% by weight, preferably 30 to 70% by weight, of methyl methacrylate and at least one, preferably one or two, further monomers chosen from acrylic esters of $C_1$-$C_{10}$-alkanols, in particular n-butyl acrylate, 2-ethylhexyl acrylate and ethyl acrylate and if appropriate a methacrylic ester of a $C_2$-$C_{10}$-alkanol in a total amount of from 20 to 80% by weight and preferably 30 to 70% by weight in copolymerized form.

Typical homopolymers and copolymers of class IV comprise, as monomers A, in each case based on the total amount of the monomers A, 30 to 100% by weight, preferably 40 to 100% by weight, and particularly preferably 50 to 100% by weight, of a vinyl ester of an aliphatic carboxylic acid, in particular vinyl acetate and 0 to 70% by weight, preferably 0 to 60% by weight and particularly preferably 0 to 50% by weight, of a $C_2$-$C_6$-olefin, in particular ethylene and if appropriate one or two further monomers chosen from (meth) acrylic esters of $C_1$-$C_{10}$-alkanols in an amount of from 1 to 15% by weight in copolymerized form.

Of the abovementioned polymers, the polymers of classes IV and V are particularly suitable.

Preference is given to homopolymers of vinyl esters of aliphatic carboxylic acids, in particular of vinyl acetate. A particular embodiment is those which are stabilized with protective colloids such as polyvinylpyrrolidone and anionic emulsifiers. Such an embodiment is described in WO 02/26845, to which reference is expressly made.

Suitable monomers B are in principle all monomers which are different from the abovementioned monomers and are copolymerizable with the monomers A. Such monomers are known to the person skilled in the art and generally serve to modify the properties of the polymer.

Preferred monomers B are chosen from monoethylenically unsaturated mono- and dicarboxylic acids having 3 to 8 carbon atoms, in particular acrylic acid, methacrylic acid, itaconic acid, amides thereof, such as acrylamide and methacrylamide, N-alkylolamides thereof, such as N-methylolacrylamide and N-methylolmethacrylamide, hydroxy-$C_1$-$C_4$-alkyl esters thereof, such as 2-hydroxyethyl acrylate, 2- and 3-hydroxypropyl acrylate, 4-hydroxybutyl acrylate, 2-hydroxyethyl methacrylate, 2- and 3-hydroxypropyl methacrylate, 4-hydroxybutyl methacrylate and monoethylenically unsaturated monomers with oligoalkylene oxide chains, preferably with polyethylene oxide chains with degrees of oligomerization preferably in the range from 2 to 200, e.g. monovinyl and monoallyl ethers of oligoethylene glycols, and esters of acrylic acid, of maleic acid or of methacrylic acid with oligoethylene glycols.

The fraction of monomers with acid groups is preferably not more than 10% by weight and in particular not more than 5% by weight, e.g. 0.1 to 5% by weight, based on the monomers M. The fraction of hydroxyalkyl esters and monomers with oligoalkylene oxide chains is, if present, preferably in the range from 0.1 to 20% by weight and in particular in the range from 1 to 10% by weight, based on the monomers M. The fraction of amides and N-alkylolamides is, if present, preferably in the range from 0.1 to 5% by weight.

Besides the abovementioned monomers B, suitable further monomers B are also crosslinking monomers, such as glycidyl ethers and esters, e.g. vinyl., allyl and methallyl glycidyl ethers, glycidyl acrylate and methacrylate, the diacetonylamides of the abovementioned ethylenically unsaturated carboxylic acids, e.g. diacetone (meth)acrylamide, and the esters of acetylacetic acid with the above-mentioned hydroxyalkyl esters of ethylenically unsaturated carboxylic acids, e.g. acetylacetoxyethyl(meth)acrylate. Suitable monomers B are also compounds which have two nonconjugated ethylenically unsaturated bonds, e.g. the di- and oligoesters of polyhydric alcohols with a,b-monoethylenically unsaturated $C_3$-$C_{10}$-monocarboxylic acids, such as alkylene glycol diacrylates and dimethacrylates, e.g. ethylene glycol diacrylate, 1,3-butylene glycol diacrylate, 1,4-butylene glycol diacrylate, propylene glycol diacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, tricyclodecenyl(meth)acrylate, N,N'-divinylimidazolin-2-one or triallyl cyanurate. The fraction of crosslinking monomers is usually not more than 1% by weight, based on the total amount of monomers, and will in particular not exceed 0.1% by weight.

Further suitable monomers B are also vinylsilanes, e.g. vinyltrialkoxysilanes. These are, if desired, used in an amount of from 0.01 to 1% by weight, based on the total amount of the monomers, in the preparation of the polymers.

Aqueous polymer dispersions are accessible in particular by free-radically initiated aqueous emulsion polymerization of ethylenically unsaturated monomers. This method has already been described widely and is thus sufficiently known to the person skilled in the art [cf. e.g. Encyclopedia of Polymer Science and Engineering, Vol. 8, pages 659 to 677, John Wiley & Sons, Inc, 1987; D. C. Blackley, Emulsion Polymerisation, pages 155 to 465, Applied Science Publishers, Ltd., Essex, 1975; D. C. Blackley, Polymer Latices, $2^{nd}$ Edition, Vol 1, pages 33 to 415, Chapman & Hall, 1997; H. Warson, The Applications of Synthetic Resin Emulsions, pages 49 to 244, Ernest Benn, Ltd., London, 1972; D. Diederich, Chemie in unserer Zeit 1990, 24, pages 135 to 142, Verlag Chemie, Weinheim; J. Piirma, Emulsion Polymerisation, pages 1 to 287, Academic Press, 1982; F. Hölscher, Dispersionen synthetischer Hochpolymerer [Dispersions of Synthetic High Polymers], pages 1 to 160, Springer-Verlag, Berlin, 1969 and the patent specification DE-A 40 03 422]. The free-radically initiated aqueous emulsion polymerization usually takes place by dispersedly distributing the ethylenically unsaturated monomers, frequently with co-use of surface active substances, in aqueous medium and polymerizing them using at least one free-radical polymerization initiator. Often, with the resulting aqueous polymer dispersions, the residual contents of unreacted monomers are reduced by chemical and/or physical methods likewise known to the person skilled in the art [see, for example, EP-A 771 328, DE-A 196 24 299, D-EA 196 21 027, DE-A 197 41 184, DE-A 197 41 187, DE-A 198 05 122, DE-A 198 28 183, DE-A 198 39 199, D-A 198 40 586 and DE-A 198 47 115], the polymer solids content is adjusted to a desired value by dilution or concentration, or further customary additives, such as, for example, bactericidal or foam-suppressing additives, are added to the aqueous polymer dispersion. The polymer solids contents of the aqueous polymer dispersions are often 30 to 80% by weight, 40 to 70% by weight or 45 to 65% by weight. The polymer powders prepared from the polymer dispersions, and aqueous dispersions which are obtainable by redispersing the polymer powders in water are likewise preferred. Both aqueous polymer dispersions and also the powders produced therefrom are, moreover, commercially available, e.g. under the brands ACRONAL®, STYRONAL®, BUTOFAN®, STYROFANR® and KOLLICOAT® from BASF-Aktiengesellschaft, Ludwigshafen, Germany, VINNOFIL® and VINNAPAS® from Wacker Chemie GmbH, Burghausen, and RHODIMAX® from Rhodia S. A.

Suitable surface-active substances for the emulsion polymerization are the emulsifiers and protective colloids customarily used for emulsion polymerization. Preferred emulsifiers are anionic and nonionic emulsifiers which, in contrast to the protective colloids, generally have a molecular weight below 2000 g/mol and are used in amounts of up to 0.2 to 10% by weight, preferably 0.5 to 5% by weight, based on the polymer in the dispersion or on the monomers M to be polymerized.

Such protective colloids have already been specified above by way of example for the microcapsule formation.

The anionic emulsifiers include alkali metal and ammonium salts of alkyl sulfates (alkyl radical: $C_8$-$C_{20}$), of sulfuric half-esters of ethoxylated alkanols (degree of EO: 2 to 50, alkyl radical: $C_8$ to $C_{20}$) and ethoxylated alkylphenols (degree of EO: 3 to 50, alkyl radical: $C_4$-$C_{20}$), of alkylsulfonic acids (alkyl radical: $C_8$ to $C_{20}$), of sulfonated mono- and di-$C_6$-$C_{18}$-alkyl diphenyl ethers, as described in U.S. Pat. No. 4,269,749, and of alkylarylsulfonic acids (alkyl radical: $C_4$-$C_{20}$). Further suitable anionic emulsifiers are given in Houben-Weyl, Methoden der organischen Chemie [Methods of organic chemistry], Volume XIV/1, Makromolekulare Stoffe [Macromolecular substances], Georg-Thieme-Veriag, Stuttgart, 1961, pp. 192-208.

Suitable nonionic emulsifiers are araliphatic or aliphatic nonionic emulsifiers, for example ethoxylated mono-, di- and trialkylphenols (degree of EO: 3 to 50, alkyl radical: $C_4$-$C_9$), ethoxylates of long-chain alcohols (degree of EO: 3 to 50, alkyl radical: $C_8$-$C_{36}$), and polyethylene oxide/polypropylene oxide block copolymers. Preference is given to ethoxylates of long-chain alkanols (alkyl radical: $C_{10}$-$C_{22}$, average degree of ethoxylation: 3 to 50) and, of these, particular preference is given to those based on oxo alcohols and native alcohols with a linear or branched $C_{12}$-$C_{18}$-alkyl radical and a degree of ethoxylation of from 3 to 50.

The molecular weight of the polymers can of course be adjusted by adding regulators in a small amount, generally up to 2% by weight, based on the monomers M to be polymerized. Suitable regulators are, in particular, organic thio compounds, and also allyl alcohols and aldehydes. In the preparation of the butadiene-comprising polymers of class I, regulators are often used in an amount of from 0.1 to 2% by weight preferably organic thio compounds, such as tert-dodecyl mercaptan.

When the polymerization is complete, the polymer dispersions used are often rendered alkaline, preferably to a pH in the range from 7 to 10, prior to their use according to the invention. For the neutralization it is possible to use ammonia or organic amines, and preferably hydroxides, such as sodium hydroxide, potassium hydroxide or calcium hydroxide, are used.

To prepare polymer powders, the aqueous polymer dispersions are subjected in a known manner to a drying process, preferably in the presence of customary drying auxiliaries. A preferred drying process is spray-drying. If required, the drying auxiliary is used in an amount of from 1 to 30% by weight, preferably 2 to 20% by weight, based on the polymer content of the dispersion to be dried.

The spray-drying of the polymer dispersions to be dried generally takes place as already described for the microcapsule dispersion, often in the presence of a customary drying auxiliary such as homo- and copolymers of vinylpyrrolidone, homo- and copolymers of acrylic acid and/or of methacrylic acid with monomers carrying hydroxyl groups, vinylaromatic monomers, olefins and/or (meth)acrylic esters, polyvinyl alcohol and in particular ar lsulfonic acid-formaldehyde condensation products and mixtures thereof.

In addition, a customary anticaking agent (antibaking agent), such as a finely divided inorganic oxide, for example a finely divided silica or a finely divided silicate, e.g. talc can be added to the polymer dispersion to be dried during the drying operation.

For certain uses of the coarsely divided preparations according to the invention, a stability of the binder polymers in water is not necessary, for example in closed nonaqueous systems. In such cases, binders which are water-soluble or partially water-soluble are also suitable.

Suitable binders are, for example, polyvinylpyrrolidone, polyvinyl alcohol or partially hydrolyzed polyvinyl acetate, and copolymers of vinyl acetate with vinylpyrrolidone, and also graft polymers of polyvinyl acetate with polyethers, in particular ethylene oxide. Graft polymers of polyvinyl acetate with ethylene oxide have proven to be particularly advantageous. Such graft polymers are described, for example, in EP-A 1 124 541, to the teaching of which reference is expressly made. Such polymers are, moreover, commercially available, e.g. under the brands KOLLIDON® and KOLLICOAT® from BASF Aktiengesellschaft.

The coarsely divided preparation can be prepared by converting the microcapsules together with the polymeric binder and water to a coarsely divided form, for example by granulation or extrusion and then, if appropriate, drying it. The binder can be added to the microcapsule powder. According to a further embodiment, the binder can be already added as spray auxiliary during the spray-drying of the microcapsules. Such preferred binders are those specified above for the spray-drying of the microcapsules. They are usually added in an amount of from 1 to 10% by weight, based on the solids fraction of the microcapsule dispersion. In these cases, the addition of further binder is possible, but is generally not necessary.

The organic protective colloids used for producing the microcapsules can also act as binders. An addition of further binders is then generally not necessary. According to this preferred variant, 10 to 100% by weight of one or more $C_1$-$C_{24}$-alkyl esters of acrylic and/or methacrylic acid (monomers I), 0 to 80% by weight of a bi- or polyfunctional monomer (monomers II), which is insoluble or sparingly soluble in water, and 0 to 90% by weight of other monomers (monomer III), in each case based on the total weight of the monomers, the latent heat storage material and the organic protective colloid are used to prepare an oil-in-water emulsion and the capsule wall is formed by free-radical polymerization, the resulting microcapsule dispersion is spray-dried and converted to a coarsely divided form.

The preparation can be produced by the methods known for agglomerates such as pellets, tablets and granules.

Agglomerates according to the invention are obtainable by agitating the microcapsule powder together with the binder in a drum or on suitable disks, so-called pelletizing pans. During drum granulation, the microcapsules migrate continuously in an axial direction through a slightly inclined rotating drum and in so doing are sprayed with the polymeric binder. During pan granulation, the microcapsules are continuously fed to a pelletizing pan by means of a metering device, dusted with the polymeric binder and, after reaching a certain granule particle size, travel over the edge of the pan. Drum and pan granulation is particularly suitable for continuous operation and thus for large-volume products. Drying advantageously takes place in a continuous fluidized bed dryer or drum dryer. For batch processes, vacuum drying is also suitable.

In addition, granules can be produced in conventional fluidized-bed granulators. In this process, the microcapsule powders, which are held in suspension by a stream of warm air directed upwards, are sprayed cocurrently or countercurrently with the polymeric binder dispersion and dried. This means the polymeric binder is sprayed onto a fluidized powder. Fluidized-bed granulation is equally suitable for batchwise operation as for continuous operation.

In one variant of the fluidized-bed granulation, an aqueous microcapsule dispersion and an aqueous binder dispersion can be sprayed into the granulator together or via two different nozzles and dried. This procedure has the advantage that the microcapsule dispersion does not have to be predried separately but can be granulated together with the binder dispersion.

In addition, granules can be prepared by mixer granulation. Mixers are used which are provided with stationary or rotating internals e.g. Diosna pharmaceutical mixer) and in the ideal case mix, granulate and dry in one operation. The microcapsule powder is built up by adding the polymeric binder and, if appropriate, water by the rearrangement motion to give granules. These are then dried in a fluidized-bed dryer, circulation dryer or vacuum dryer and size-reduced by means of sieving machines or mills. A vacuum rotary mixing dryer is particularly gentle and dust-free for example.

According to another embodiment, the microcapsules are extruded together with the polymeric binder.

The coarsely divided preparation is produced by adding water and the polymeric binder. Here, it is possible to meter in the water to the microcapsule and/or binder powder. According to a preferred embodiment, the microcapsule powder is mixed directly with a binder dispersion of the desired water content. The water content is 10-40% by weight based on the total mixture. A lower water content leads to incomplete mixing of the two components and poor moldability. Higher water contents are in principle possible, above 50% by weight the mass can no longer be extruded but deliquesces. Preference is given to a water content of 20-35% by weight at the discharge point since the resulting pellets already have good strength in this range.

Extruders such as single- or twin-screw extruders and so-called melt calendering or melt tableting are suitable. Twin-screw extruders operate according to the principle of a mixing unit which at the same time conveys forwards to a die tool and compacts.

According to a preferred embodiment, the product is compacted in the feed zone towards the heating zone. In the middle zone of the extruder the substances are dispersed and, if appropriate degassed. In the end zone of the extruder, the mixture is discharged under pressure through a die tool. The die tool can consist as desired of one or more perforated dies or a plane die or have a more complex shape for example tubular. Extrusion is carried out in the temperature range of the glass transition temperature of the binder polymer and preferably below the softening or decomposition temperature of the microcapsule wall. The binder polymer should form a film under the process conditions i.e. it should at least partially melt or soften without however, becoming thin-liquid in order to shape the microcapsule preparation. A suitable temperature range is the range from 25 K below to about 50 K above the glass transition temperature. The softening range of the binder polymer can, however, from time to time be significantly reduced by plasticizer or solvent effects, meaning that in the presence of these substances, processing up to 50 K below the glass transition temperature is also possible. If volatile plasticizers are used, it is thus possible to remove these after the shaping process, as a result of which greater strength is achieved. Since water is a plasticizer for polar and the water-soluble, film-forming polymers, consideration of the glass transition temperature of the pure polymer is not appropriate in these cases.

According to a preferred variant, the temperatures in the extruder are 40 to 120° C. Here, it is possible for a constant temperature to prevail. It is likewise possible for a temperature gradient from 40 to 120° C. to prevail along the direction of conveyance of the microcapsule/binder mixture. Here, for the gradient, any graduations are possible from continuous to stepwise. Agglomeration at these temperatures has the advantage that some of the water evaporates during the mixing and/or compaction process.

Other additives of the coarsely divided microcapsule preparation may be: dyes, pigments, fragrances, antistats and hydrophilizing agents.

The microcapsule preparations according to the invention have the latent heat storage material tightly enclosed, meaning that no emissions into the surrounding air can be detected. This allows their use not only in closed systems, but, moreover, also in open systems.

The coarsely divided microcapsule preparations are exceptionally suitable for use in building materials and as storage material in heat exchangers. They exhibit good hardness and are abrasion-resistant. Their coarsely divided structure allows the storage geometry to be chosen freely, for example beds for floor coverings, chemical reactors or columns, and in through-flow applications such as heat exchangers in solar installations, heating, in particular warm-air heating and central and decentral ventilation.

Due to the favorable ratios of surface area to intermediate spaces between the particles, considerable heat transfer is possible, which can be dissipated rapidly by the good through-flow properties of any desired carrier material such as air or water. Based on the volume of the preparation, the coarsely divided microcapsules have ver high storage capacity and thus have a very high degree of activity. Thus, in contrast to conventional heat storage media they have a low space requirement and also a lower storage weight for the same storage capacity.

The coarsely divided microcapsule preparations according to the invention can, moreover, be advantageously processed together with mineral or silicatic binder building materials. Suitable mineral binders are generally known. These are finely divided inorganic substances such as lime, gypsum, clay, loam and cement, which are converted to their ready-to-use form by stirring with water and solidify upon drying as a function of time, if appropriate at increased temperature. The coarsely divided microcapsule preparations according to the invention are converted to the ready-to-use moldings together with the mineral binder, water, aggregates such as gravel, sand, glass or mineral fibers and, if appropriate, auxiliaries.

The examples below are intended to illustrate the invention in more detail.

A microcapsule powder obtained as in Example 1 of DE 101 63 162 with subsequent spray-drying was used. The microcapsules had an average diameter of 7.3 µm.

EXAMPLE 1

1900 g of the above-described microcapsule powder were slowly admixed with 1963 g of 30% strength by weight polyvinyl acetate dispersion (Kollicoat SR 30 D) with stirring in a Diosna mixer model V 50. The moist mass was thoroughly mixed for 6 min by switching on the chopper (stage 1) so that the amount of liquid was evenly distributed. This mass was then extruded in an Alexanderwerk laboratory granulator model RSA with vertical sieve of mesh width 3.0 mm. The moist extrudates were dried in a Retsch fluidized-bed dryer model TG 100 at an inlet temperature of 30° C. Dry extrudates with a diameter of about 3 mm and a length of 5 mm were obtained which were hard and abrasion-stable.

Binder fraction in the granules: 24% by weight
Paraffin (latent heat storage material) fraction in the granules: 66% by weight.
Abrasion Test The abrasion (friability) is defined as the mass loss at a certain mechanical load and is therefore given as a percentage of the starting mass. To determine the abrasion (friability), a number of dedusted extrudates is weighed and subjected for a certain time to a defined failing, rolling, sliding and shaking load. After the dedusting, the extrudates are weighed and the mass loss is calculated in percent.

Determination of the abrasion in the friabilator model TAR-20 (Erweka:

The microcapsule granules were weighed in and rotated in the drum at 25 rpm. The test time was 4 min. The abraded dust was separated off through a large-meshed sieve, the residual mass of the granules was weighed and the mass loss was calculated in percent. The abrasion of the product of Example 1 was 0.4%.

EXAMPLE 2

2940 g of the above-described microcapsule powder were slowly admixed with 1779 g of 20% strength by weight aqueous solution of polyethylene glycol-polyvinyl alcohol (25:75) graft copolymer (Kollicoat IR) with stirring in a Diosna mixer model V 50. The moist mass was thoroughly mixed for 8 min by switching on the chopper (stage 1) so that the amount of liquid was distributed evenly. This mass was then extruded in an Alexanderwerk laboratory granulator model RSA with vertical sieve of mesh width 3.0 mm. The moist extrudates were dried in a Retsch fluidized-bed dryer model TG 100 at an inlet temperature of 40° C. Dry extrudates with a diameter of about 3 mm and a length of 4 mm were obtained which were hard and abrasion-resistant.

EXAMPLE 3

(Polyvinyl Acetate Dispersion as Binder)

3367 g of the above-described microcapsule powder (m.p. 28° C.) were processed with 2978 g of Kollicoat SR 30 D to give a moist paste and granulated using a rotor fine granulator from Alexanderwerk. The granules produced were dried in the fluidized bed (40° C., 1 h).

Binder fraction in the granules: 21%
Paraffin fraction in the granules: 69%

EXAMPLE 4

Machine: Closely intermeshing co-rotating twin-screw extruder model FTS16 mm, exit die 1-3 mm, 5 heating zones from the entry opening to the discharge die, zone 1 to 4 heated to 75° C., zone 5 heated to 85° C. The extruder screw used consists, apart from one element (return element) roughly in the middle, of conventional conveying elements with which incorporation by a strong shear field in the interstice region is ensured. The overall throughput is 775 g/h, the screw rotary speed 150 rpm. The pressure build-up in the screw ensures continuous discharge of the wetted latent heat storage powder.

Materials:

A) Spray-dried PMMA microcapsule powder according to DE 197 49 731 with a core of n-octadecane consisting of 87% by weight core, 10% by weight crosslinked PMMA wall (PMMA=polymethyl methacrylate) and 3% dispersant polyvinyl alcohol.

B) 55% strength by weight aqueous polymer dispersion of a polymer of 88% by weight styrene, 10% by weight acrylonitrile and 2% by weight acrylic acid, number-average molecular weight $M_n$: 8000, volume-average molecular weight $M_w$: 45 000, glass transition temperature Tg: 105° C.

In a vessel 92 g of dispersion B), 183 g of water and 500 g of microcapsule powder A) were mixed and placed into the filling funnel of the extruder. This amount of material is completely drawn in and processed over the course of one hour. After a few minutes the temperature at the top of the extruder reaches 91° C. At this temperature the material is homogeneously and uniformly conveyed from the die and, as result of anhydrous dry chopping, obtained in the form of granules about 3 mm in width and 5 mm in length. The theoretical binder fraction in the granules is 9.2% by weight; the paraffin fraction in the end product is 79%. The granules were then dried in a stream of warm air. The granules can be broken with the fingers with a certain application of force, but are stable upon shaking the granules. Even after storage for several days under water the granules are stable without dissolution phenomena.

EXAMPLE 5

The following material was processed using the extruder experimental set-up as in Example 4:

A) PMMA microcapsule powder which was obtained by preparing a microcapsule dispersion as in DE 101 63 162, Example 1 with a core of n-octadecane and spray-drying it as follows. A 10% strength by weight aqueous solution of polyvinyl alcohol (79% saponified, average molecular weight 90 000) and methylhydroxypropylcellulose (viscosity 100 mPas at 2% in water) in the ratio 1:1 was added to the microcapsule dispersion. The amount of spray auxiliary was chosen such that 1.5% by weight of polyvinyl alcohol and 1.5% by weight of methylhydroxypropylcellulose, in each case based on 100% by weight of microcapsules, are used. This formulation was spray-dried.

For the extrusion experiments described below no further binder was added.

In a vessel 230 g of water and 500 g of microcapsule powder A) were mixed and placed into the filling funnel of the extruder. This amount of material was completely drawn in and processed over the course of one hour. After a few minutes, the temperature at the top of the extruder reached 91° C. At this temperature the material was homogeneously and uniformly conveyed from the die and, as result of anhydrous dry chopping, obtained in the form of granules about 3 mm in width and 5 mm in length. The granules were then dried in a stream of warm air. The granules could be broken using the fingers with a certain application of force, but were stable upon shaking the granules. Even after storage for several days under water the granules were stable without dissolution phenomena. The result demonstrates that the spray auxiliary added acts as binder.

EXAMPLE 6

In a vessel 2 g of dispersion B) from Example 4, 6 g of water and 9 g of microcapsule powder A) from Example 1 were stirred using a wooden spatula to give a pasty mass (binder content about 10.9% by weight). This mass was introduced into a 100 ml plastic syringe and a few strands, approximately 2 mm in width, were deposited on a silicone paper. These strands were dried at 60° C. in the drying cabinet with circulated air for 3 hours and then heat-treated at 120° C. for one hour. The strands were solid and broke only under the application of force. The strands were then broken into pieces about 5 mm in length. After storage in water for 24 hours, the resulting granules exhibited no turbidity of the water.

Analogously, an experiment with only 1 g of dispersion B) from Example 4 was carried out (binder content about 5.8% by weight). The strands were somewhat easier to break, but were still so solid that they did not break by themselves when shaken in a glass bottle. After storage in water for 24 hours the granules were still held together and the water was barely turbid.

We claim:

1. A coarsely divided microcapsule preparation with particles whose particle sizes are in the range from 200 µm to 5 cm, comprising microcapsules with a capsule core of latent heat storage material and a thermosetting polymer as capsule wall and one or more polymeric binders whose binder polymer has a glass transition temperature of from −60 to +150° C., has thermoplastic properties and film-forming properties under processing conditions and is constructed from one or more ethylenically unsaturated monomers by emulsion polymerization, where the binder content, calculated as solid, is 1-30% by weight, based on the total weight of the coarsely divided microcapsule preparation wherein said binder polymer is at least one polymer selected from the group consisting of a copolymer of styrene with an alkyl(acrylate), a copolymer of styrene with butadiene, a polymer of an alkyl(meth)acrylate, a homopolymer of a vinyl ester of an aliphatic carboxylic acid, a copolymer of a vinyl ester of an aliphatic carboxylic acid with an olefin, a copolymer of a vinyl ester of an aliphatic carboxylic acid with an alkyl (meth) acrylate, a copolymer of a vinyl ester of an aliphatic carboxylic acid with an aliphatic carboxylic acid and an alkyl(meth)acrylate and a copolymer of styrene with acrylonitrile wherein the capsule wall comprises from 10 to 100% by weight one or more $C_1$-$C_{24}$-alkyl esters of acrylic acid/or methacrylic acid, 0 to 80% by weight of a bi- or polyfunctional monomer which is insoluble or sparingly soluble in water and 0 to 90% by weight of other monomers in each case based on the total weight of the monomers; and wherein said coarsely divided microcapsule preparation is an aggregation of said microcapsules.

2. The coarsely divided microcapsule preparation according to claim 1, wherein 90% by weight of the particles are greater that 500 µm.

3. The coarsely divided microcapsule preparation according to claim 1, wherein the binder content calculated as solid is 1-25% by weight based on the total weight of the coarsely divided microcapsule preparation.

4. The coarsely divided microcapsule preparation according to claim 1, wherein the latent heat storage material is a lipophilic substance with a solid/liquid phase transition in the temperature range from −20 to 120° C.

5. The coarsely divided microcapsule preparation according to claim 1, wherein the latent heat storage material is an aliphatic hydrocarbon compound.

6. The coarsely divided microcapsule preparation according to claim 1, wherein the capsule wall is a thermosetting polymer selected from the group consisting of highly crosslinked acrylic ester polymers, highly crosslinked methacrylic ester polymers and mixtures thereof.

7. The coarsely divided microcapsule preparation according to claim 1, wherein the capsule wall is constructed from 10 to 100% by weight of one or more $C_1$-$C_{24}$-alkyl esters of acrylic and/or methacrylic acid, 10 to 80% by weight of a bi- or polyfunctional monomer which is insoluble or sparingly soluble in water and 0 to 90% by weight of other monomers in each case based on the total weight of the monomers.

8. The coarsely divided microcapsule preparation according to claim 1, wherein the binder polymer is a homopolymer of vinyl esters of aliphatic carboxylic acids or a copolymer of vinyl esters of aliphatic carboxylic acids with olefins and/or alkyl(meth)acrylates.

9. The coarsely divided microcapsule preparation according to claim 1, wherein the binder polymer is a copolymer of styrene with acrylonitrile.

10. A method of producing coarsely divided microcapsule preparations according to claim 1, comprising extruding the microcapsules, together with the polymeric binder dispersion and water, to a coarsely divided form and then, if appropriate, drying.

11. A method of producing coarsely divided microcapsule preparations according to claim 1, comprising extruding the microcapsules, together with the polymeric binder dispersion, at temperatures in the range 25 K below to 50 K above the glass transition temperature of the binder polymer and then, if appropriate, drying.

12. The method of producing coarsely divided microcapsule preparations according to claim 11, wherein the extruding is carried out at temperatures in the range from 60 to 110° C.

13. A heat exchanger comprising the coarsely divided microcapsule preparation as in claim 1.

14. Building materials comprising coarsely divided microcapsule preparation as in claim 1.

15. The coarsely divided microcapsule preparation according to claim 1, wherein said microcapsules have an average particle size of from 0.5 to 100 µm.

16. The coarsely divided microcapsule preparation according to claim 1, wherein said microcapsules have an average particle size of from 1 to 50 µm.

17. The coarsely divided microcapsule preparation according to claim 1, wherein a weight ratio of capsule core to capsule wall is from 50:50 to 95:5.

18. The coarsely divided microcapsule preparation according to claim 1, wherein a weight ratio of capsule core to capsule wall is from 70:30 to 93:7.

19. The coarsely divided microcapsule preparation according to claim 1, wherein said particle sizes range from 500 µm to 2 cm.

* * * * *